Dec. 27, 1966 I. E. LEMPERT 3,294,917
STEREO MULTIPLEX RECEIVING APPARATUS
Filed April 8, 1965
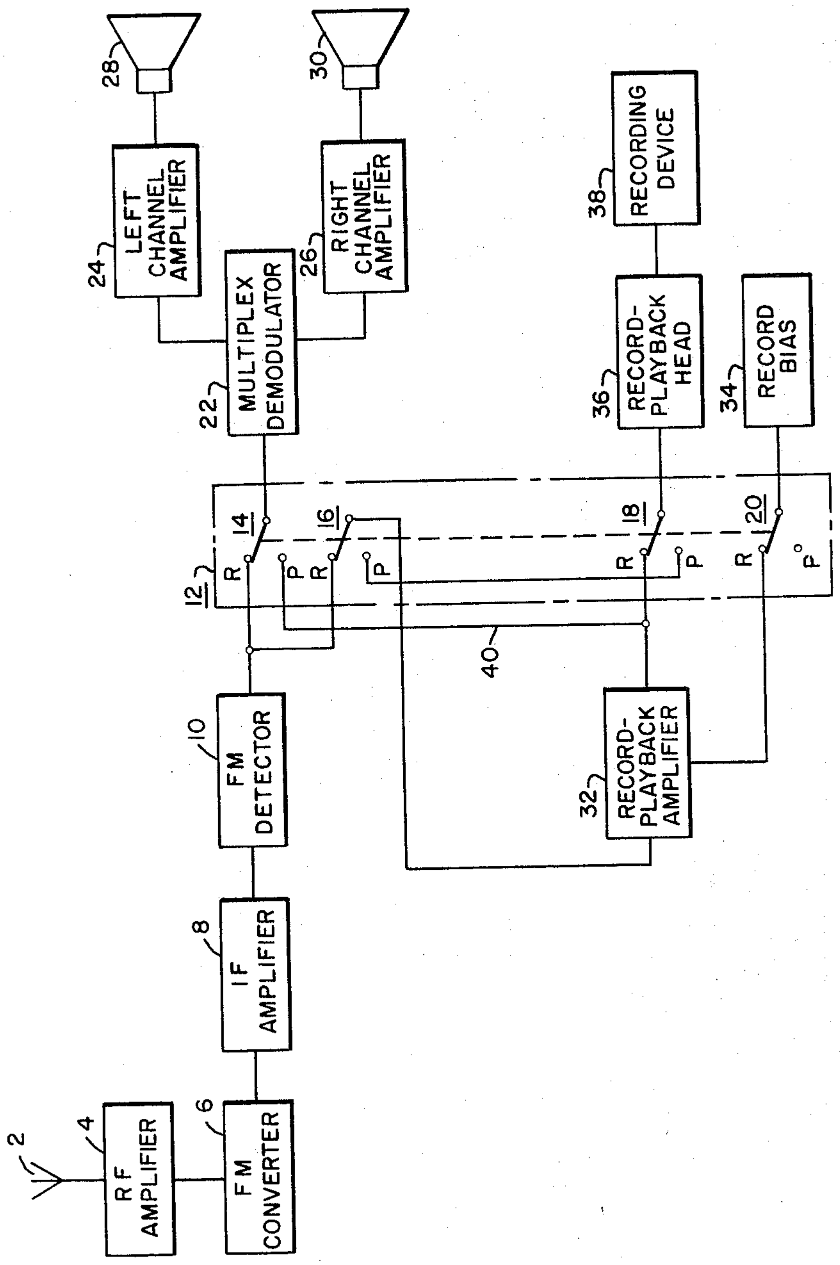
WITNESSES:
Bernard R. Gieguez
James F. Young
INVENTOR
Irving E. Lempert
BY
[signature]
ATTORNEY United States Patent Office 3,294,917
Patented Dec. 27, 1966

3,294,917
STEREO MULTIPLEX RECEIVING APPARATUS

Irving E. Lempert, Metuchen, N.J., assignor to Westinghouse Electric Corporation, Pittsburgh, Pa., a corporation of Pennsylvania Filed Apr. 8, 1965, Ser. No. 446,647
5 Claims. (Cl. 179—15)

The present invention relates to frequency modulated stereo multiplex receiving systems, and more particularly to such systems having recording and play-back features incorporated therein.

A frequency modulated multiplex system has been authorized for FM stereo broadcasting which permits the reconstitution of left and right channel information as picked up at the transmission point. In the standardized system, the transmitter carrier frequency is frequency modulated by what may be called a composite audio stereo signal. The composite signal is made up of the following components: the sum of the left and right channel information (L+R); the difference sidebands (L+R) resulting from amplitude modulating a 38 kc. subcarrier, which is suppressed with the L—R signal; and a 19 kc. pilot frequency which is utilized to reconstitute the suppressed subcarrier at the receiver for demodulation purposes. If it is desired to record a stereo transmission, it is usually necessary that two separate recording channels be provided such as a multitrack tape recorder with dual recording and playback channels. The requirement of dual, matched channels is expensive as well as complicated.

It is, therefore, an object of the present invention to provide new and improved frequency modulated stereo multiplex receiving apparatus including a single channel record-playback feature.

It is a further object of the present invention to provide new and improved frequency modulated stereo multiplex receiving apparatus which permits the recording of the composite audio stereo signal and its retrieval by using only a single channel recording device.

Accordingly, the present invention provides a stereo multiplex receiving apparatus in which stereo multiplex signals are received and converted to provide composite audio stereo signals. The composite signals are then recorded as they appear on a single channel recording device. To retrieve the recorded information, the receiver is switched so that the single channel recorded composite signals are then played back through the multiplex demodulator of the receiver which converts the composite signals into left and right channel information.

These and other objects of the present invention will become more apparent when considered in view of the following specification and drawings, in which:

The single figure is a schematic-block diagram of the receiving apparataus of the present invention.

Referring to the single figure, the FM stereo multiplex receiver of the present invention is shown wherein incoming FM stereo multiplex signals are received at an antenna 2. The incoming stereo multiplex signals include a transmitter carrier frequency which has been modulated by a composite audio stereo signal. The composite audio stereo signal consists of: the sum of the left and right channel signals L+R; the difference sidebands L—R, resulting from amplitude modulating a 38 kc. subcarrier frequency; and a 19 kc. pilot frequency. From the antenna 2, the multiplex stereo signals are applied to an RF amplifier 4 wherein the signals are amplified and then applied to an FM converter 6. The FM converter 6 converts the incoming signals from a radio frequency to an intermediate frequency as is well known. The intermediate frequency signals are then applied to an IF amplifier 8 wherein they are amplified and then applied to an FM detector 10. The FM detector 10 operates in a well known manner to provide a detected output which consists of the composite audio stereo signals as described above. The element 2, 4, 6, 8 and 10, as described, comprise standard circuitry which could appear in any standard FM receiver.

A switching circuit 12, shown by the dotted box, is provided to effect the necessary switching operations for the record and playback operations of the present apparatus. The switching circuit 12 includes four switches 14, 16, 18 and 20. Each of the switches include two positions R and P, which indicate record and playback respectively. The switches are shown in the record position R.

The composite audio stereo signals at the output of the FM detector 10 are applied through the record position R of the switch 14 to a multiplex demodulator 22. The multiplex demodulator functions as is well known in the art to demodulate the incoming composite signals into their left and right channel components, utilizing the pilot signal to reconstitute the originally suppressed subcarrier signal. The left and right channel information is then applied from the multiplex demodulator 22 to the left and right channel amplifiers 24 and 26, respectively. The output of the left channel amplifier is applied to a speaker 28 and the output of the right channel amplifier 26 is applied to a speaker 30. The original left and right signals are recreated as audible sound at the speakers 28 and 30 in the well known manner.

The output of the FM detector 10, which comprises the composite audio stereo output signals, is also applied to a record-playback amplifier 32 through the record position R of the switch 16. If magnetic recording is used, the necessary biasing signal for the record-playback head 36 is provided by a record bias circuit 34 which is connected to the record-playback amplifier 32 by the record position R of the switch 20. The output of the record-playback amplifier 32, which consists of the amplified composite audio stereo signals and the biasing signal, is applied through the record position R of the switch 18 to a record-playback head 36. The composite audio stereo signals are then converted by the record-playback head 36 to be recorded in a recording device 38 which is a single channel device. For example, the recording device may comprise a single track tape recorder, or a single track, monaural disc recording device. Thus, the composite audio stereo signals are recorded as received in a single channel so that the sum components L+R, the sidebands of the difference components L—R, and the pilot signal component are recorded in the recording device 38 as a composite signal on a single channel as a one channel type of signal.

It should be noted that the multiplex demodulator 22 need not be in the circuit during the record portion of the operation of the receiver, but may be disconnected from the FM detector by opening the switch 14 from the record position R. This will permit the composite audio stereo signals to be recorded without information being applied to the multiplex demodulator 22 and thence to the speakers 28 and 30.

In order to playback the information recorded on the single channel, the switches 14, 16, 18 and 20 are switched to their playback position P. With the switches in this condition, the record bias circuit 34 will be disconnected from the record-playback amplifier 32. The recording device 38 will be connected through the record-playback head 36 to the record-playback amplifier 32 through the P positions of the switches 18 and 16 respectively. Thus, the composite audio stereo signals recorded in the recording device 38 will be picked up by the record-playback head 36, now operating in its playback mode, and will be applied to the record-playback amplifier 32 to be amplified. The previously recorded composite stereo audio signals are then amplified in the record-playback amplifier 32 and applied through a lead 40 and through the playback position P of the switch 14 to the multiplex demodulator 22. The previously recorded composite audio stereo signals are then demodulated into their left and right channel components in the demodulator 22 and applied to the left and right channel amplifiers 24 and 26 and the speakers 28 and 30, respectively.

It can thus be seen by taking the composite audio stereo signals from the output of the FM detector 10 that these signals may be recorded as thus received on a single channel such as a single track tape recorder or a monaural disc recording device. The necessity of a dual channel, multitrack recording device is thereby eliminated with the attendant savings in cost and complexity.

Although the present invention has been described with a certain degree of particularity it should be understood that the present disclosure has been made only by way of example and that numerous changes in the details of construction and the combination of parts, elements and components may be resorted to without departing from the scope and the spirit of the present invention.

I claim as my invention:

1. In stereo multiplex receiving apparatus operative with stereo multiplex signals, the combination of: receiving means for receiving said multiplex signals and for producing composite audio stereo signals; multiplex demodulator means for converting said composite signals into left and right channel information; record-playback means for recording said composite signals and switching means for selectively (1) connecting said receiving means to said record-playback means for recording said composite audio stereo signals as received from said receiving means, and (2) connecting said record-playback means to said multiplex demodulator means for playing back the recorded composite signals through said multiplex demodulator means to obtain the left and right channel information.

2. In frequency modulated stereo multiplex receiving apparatus operative with frequency modulated stereo multiplex signals, the combination of: input means for receiving said multiplex signals; frequency modulation detector means operatively connected to said input means for providing composite audio stereo signals; multiplex demodulator means for converting said composite signals into left and right channel information; record-playback means for recording said composite signals; and switching means for selectively (1) connecting said detector means to said record-playback means for recording said composite signals as received from said detector means, and (2) connecting said record-playback means to said multiplex demodulator means for playing back the recorded composite signals through said multiplex demodulator means to obtain the left and right channel information.

3. In frequency modulated stereo multiplex receiving apparatus operative with frequency modulated stereo multiplex signals, the combination of: input means for receiving said multiplex signals; frequency modulation detector means operatively connected to said input means for providing composite audio stereo signals; multiplex demodulator means for converting said composite signals into left and right channel information; record-playback means for recording said composite signals on a single channel; and switching means for selectively (1) connecting said detector means to said record-playback means for recording said composite signals as received from said detector means, and (2) connecting said record-playback means to said multiplex demodulator means for playing back the recorded composite signals from the single channel through said multiplex demodulator means to obtain the left and right channel information.

4. In frequency modulated stereo multiplex receiving apparatus operative with frequency modulated stereo multiplex signals, the combination of: input means for receiving said multiplex signals; frequency modulation detector means operatively connected to said input means for providing composite audio stereo signals; multiplex demodulator means for converting said composite signals into left and right channel information; single track record-playback means for recording said composite signals on a single channel; and switching means for selectively (1) connecting said detector means to said record-playback means and said multiplex demodulator means for recording said composite signals as received from said detector means, and (2) disconnecting said detector means from said multiplex demodulator means and connecting said record-playback means to said multiplex demodulator means for playing back the single track recorded composite signals from the single channel through said multiplex demodulator means to obtain the left and right channel information.

5. In frequency modulated stereo multiplex receiving apparatus operative with frequency modulated stereo multiplex signals, the combination of: input means for receiving said multiplex signals; frequency modulation detector means operatively connected to said input means for providing composite audio stereo signals; multiplex demodulator means for converting said composite signals into left and right channel information; a single track tape recorder for recording said composite signals on a single channel; and switching means for selectively (1) connecting said detector means to said tape recorder and said multiplex demodulator means for recording said composite signals received from said detector means, and (2) disconnecting said detector means from said multiplex demodulator means and connecting said tape recorder to said multiplex demodulator means for playing back the single track recorded composite signals from the single channel through said multiplex demodulator means to obtain the left and right channel information.

References Cited by the Examiner

UNITED STATES PATENTS 3,018,335 1/1962 De Rosa ____________ 179—15

DAVID G. REDINBAUGH, *Primary Examiner.*

R. L. GRIFFIN, *Assistant Examiner.*